(12) United States Patent
Andrews et al.

(10) Patent No.: US 8,554,894 B2
(45) Date of Patent: Oct. 8, 2013

(54) NETWORK SCHEDULING FOR ENERGY EFFICIENCY

(75) Inventors: Daniel Matthew Andrews, Chatham, NJ (US); Yihao Zhang, Chatham, NJ (US); Antonio Fernandez, Madrid (ES)

(73) Assignee: Alcatel Lucent, Paris (FR)

( * ) Notice: Subject to any disclaimer, the term of this patent is extended or adjusted under 35 U.S.C. 154(b) by 662 days.

(21) Appl. No.: 12/723,116

(22) Filed: Mar. 12, 2010

(65) Prior Publication Data

US 2011/0225318 A1 Sep. 15, 2011

(51) Int. Cl.
*G06F 15/16* (2006.01)

(52) U.S. Cl.
USPC ........... 709/223; 709/231; 709/234; 709/235; 709/236; 709/238; 709/239; 709/240

(58) Field of Classification Search
USPC ......... 709/232, 233, 234, 235, 236, 238, 239, 709/240
See application file for complete search history.

(56) References Cited

U.S. PATENT DOCUMENTS

| 8,228,934 B2* | 7/2012 | Jeong et al. | 370/431 |
| 2003/0137945 A1 | 7/2003 | Yavatkar et al. | |
| 2005/0122233 A1 | 6/2005 | Isoyama et al. | |
| 2009/0103501 A1* | 4/2009 | Farrag et al. | 370/337 |
| 2010/0027458 A1* | 2/2010 | Wu et al. | 370/315 |
| 2010/0316387 A1* | 12/2010 | Suvakovic | 398/98 |

FOREIGN PATENT DOCUMENTS

WO PCTUS2011026409 5/2011

OTHER PUBLICATIONS

S. Nedevschi et al., "Reducing Network Energy Consumption via Sleeping and Rate-Adaptation," USENIX Association, NSDI '08: 5th USENIX Symposium on Networked Systems Design and Implementation, Apr. 2008, pp. 323-336.
L. Wang et al., "An Adaptive Energy-Efficient and Low-Latency MAC Protocol for Wireless Sensor Networks," Wireless Communications, Networking and Mobile Computing, Wicom, IEEE, 2007, pp. 2440-2443.
I. Marin et al., "LL-MAC: A Low Latency MAC Protocol for Wireless Self-Organised Networks," Microprocessors and Microsystems, IPC Business Press Ltd, Jun. 2008, pp. 197-209, vol. 32, No. 4.
G. Lu et al., "An Adaptive Energy-Efficient and Low-Latency MAC for Data Gathering in Wireless Sensor Networks," Procs. of the 18th International Parallel and Distributed Processing Symposium (IPDPS), 2004, 8 pages.
B-G. Chun et al., "Evaluation of Packet Scheduling Algorithms in Mobile Ad Hoc Networks," Mobile Computing and Communications Review, Jul. 2002, pp. 36-49, vol. 6, No. 3.

* cited by examiner

*Primary Examiner* — Firmin Backer
*Assistant Examiner* — Jonathan Bui
(74) *Attorney, Agent, or Firm* — Ryan, Mason & Lewis, LLP

(57) ABSTRACT

A network comprising a plurality of network devices is configured to implement scheduling for energy efficiency. In one aspect, a set of network devices interconnected in a line within a network is identified, and a common frame size is established. For each of the network devices of the line, active and inactive periods for that network device are scheduled in a corresponding frame having the common frame size, with the frames in the respective network devices of the line being time shifted relative to one another by designated offsets. For each of one or more of the active periods of each of the network devices of the line, received packets are scheduled for processing in that network device.

20 Claims, 5 Drawing Sheets

NETWORK SCHEDULING FOR ENERGY EFFICIENCY

FIELD OF THE INVENTION

The present invention relates generally to communication networks, and more particularly to techniques for scheduling packets for processing in network devices of such a network.

BACKGROUND OF THE INVENTION

U.S. telecommunication infrastructure is estimated to consume 60 billion kilowatt hours of power per year. Such an enormous consumption partially results from the fact that most networks are engineered to handle peak traffic. Network devices such as routers and switches tend to operate at full speed and consume maximum power, while typical traffic levels are only a small fraction of the maximum throughput.

One known approach to reducing energy consumption in a network involves powering down particular network devices from time to time. For example, these network devices may be placed into a sleep mode, an off state or other type of inactive state in which power consumption of the network device is considerably reduced relative to its maximum power consumption. However, during such downtime any packets arriving at the network device for processing have to be buffered, and this can cause significant delay in the transport of the packets through the network. Thus, minimizing the period of time that the network devices are in their respective active states and minimizing delays in packet transmission through the network become two conflicting goals. This problem is compounded by the fact that there is often a considerable transition time involved in switching a given network device between its active and inactive states.

In order to address the costs associated with transition of network devices between their active and inactive states, it has been proposed that edge routers of a network group packets having the same source and destination and transmit them in bursts, in order to reduce the number of transitions and increase the inactive time of the network devices. See S. Nedevschi et al., "Reducing Network Energy Consumption via Sleeping and Rate-Adaptation," in J. Crowcroft and M. Dahlin, eds., NSDI, pp. 323-336, USENIX Association, 2008. However, such an approach can still lead to considerable delay for packet transmission through the network, and fails to provide a global optimization that simultaneously addresses both energy consumption and delay minimization.

SUMMARY OF THE INVENTION

Illustrative embodiments of the present invention provide scheduling techniques that significantly increase the energy efficiency of a given communication network while also minimizing packet delay.

In one aspect of the invention, a communication network comprising a plurality of network devices is configured to implement scheduling for energy efficiency. More particularly, a set of network devices interconnected in a line within a network is identified, and a common frame size is established. For each of the network devices of the line, active and inactive periods for that network device are scheduled in a corresponding frame having the common frame size, with the frames in the respective network devices of the line being time shifted relative to one another by designated offsets. For each of one or more of the active periods of each of the network devices of the line, received packets are scheduled for processing in that network device.

In one of the illustrative embodiments, the scheduling of received packets for processing in an active period of the network device may be performed on a farthest-to-go basis such that, within the active period, packets having a longer distance to travel in the network are given priority over packets having a shorter distance to travel in the network.

In another aspect of the invention, a first one of the network devices of the line may send a message to a second one of the network devices of the line with the message specifying a particular one of the offsets between the frame in the first network device and the frame in the second network device. The particular offset may denote, for example, a time separation between start of a first active period of the frame in the first network device and start of a first active period of the frame in the second network device. More generally, each of the network devices of the line other than a final network device of the line may send to its immediate downstream neighboring network device of the line a message specifying an offset between initial active periods of the respective sending and neighboring network devices.

The disclosed techniques may be applied to multiple lines within the network. For example, the network may be partitioned into a plurality of lines each comprising a corresponding set of network devices interconnected in a line. A given one of the packets may switch from a first one of the lines to a second one of the lines, and in conjunction with that line switch the packet may wait at a first network device of the second line for a first active period of a frame in the first network device.

The illustrative embodiments improve the energy efficiency of a communication network by scheduling active and inactive periods for particular nodes of the network in a coordinated manner that minimizes the impact of transitions between active and inactive periods on packet delay.

These and other features and advantages of the present invention will become more apparent from the accompanying drawings and the following detailed description.

DETAILED DESCRIPTION OF THE INVENTION

The invention will be described herein in conjunction with illustrative embodiments of communication networks, network devices and associated scheduling processes. It should be understood, however, that the invention is not limited to use with the particular networks, devices and processes described, but is instead more generally applicable to any network application in which it is desirable to provide improved energy efficiency by coordinated scheduling of active and inactive periods of the network devices.

Figure 1:
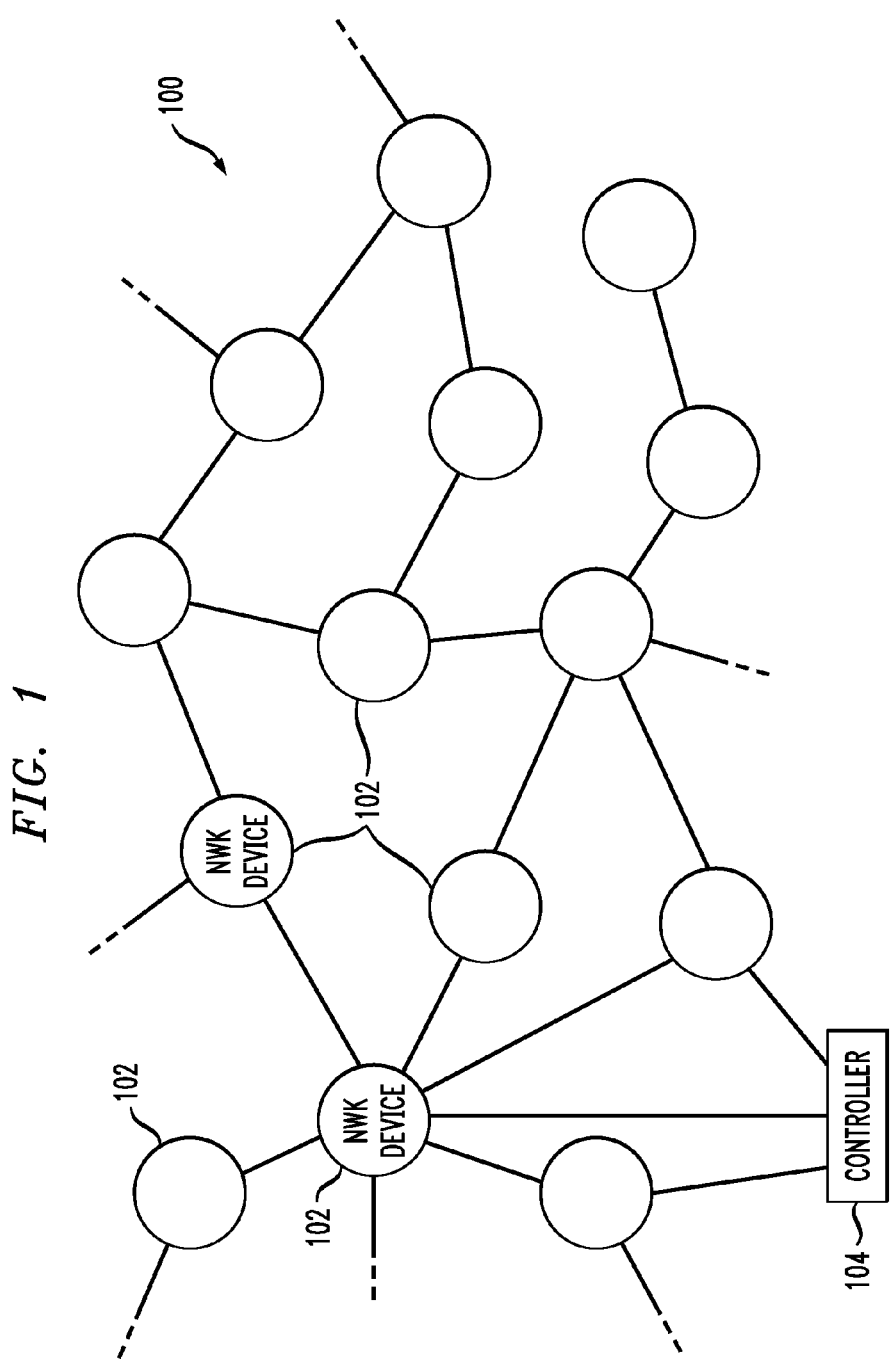
FIG. 1 shows a communication network in an illustrative embodiment of the invention.

FIG. 1 shows a communication network 100 comprising a plurality of interconnected network devices 102. The network devices 102 may comprise routers, switches, servers, computers or other processing devices, in any combination, examples of which may also be referred to herein as network nodes or terminals. A given network device will generally comprise a processor and a memory coupled to the processor, as well as a transceiver which allows the network device to communicate with the other network devices to which it is interconnected. At least a subset of the network devices 102 are coupled to a controller 104 as shown.

As will be described in greater detail below, the network 100 is configured to implement a coordinated scheduling process that significantly increases the energy efficiency of a given communication network while also minimizing packet delay. The scheduling process in the present embodiments may be implemented in a distributed manner, using schedulers and other elements within the network devices, as will be illustrated in FIGS. 2 through 7. The controller 104 in such embodiments may be utilized to facilitate the communication of offsets or other scheduling information between the network elements, or may perform certain computations or other operations associated with the scheduling process. Alternatively, the scheduling process may be implemented in a centralized manner, with the controller performing substantially all of the scheduling operations and conveying the appropriate schedule to each of the network devices. As yet another example, the controller 104 may be eliminated altogether and the scheduling process implemented in a fully distributed manner, with no centralized control. Embodiments of the invention may therefore be fully distributed, fully centralized, or may utilize a hybrid of distributed and centralized control.

The network 100 may comprise any type of communication network suitable for transporting data or other signals, and the invention is not limited in this regard. For example, portions of the network 100 may comprise a wide area network such as the Internet, a metropolitan area network, a local area network, a cable network, a telephone network, a satellite network, as well as portions or combinations of these or other networks. The term "network" as used herein is therefore intended to be broadly construed.

Figure 2:
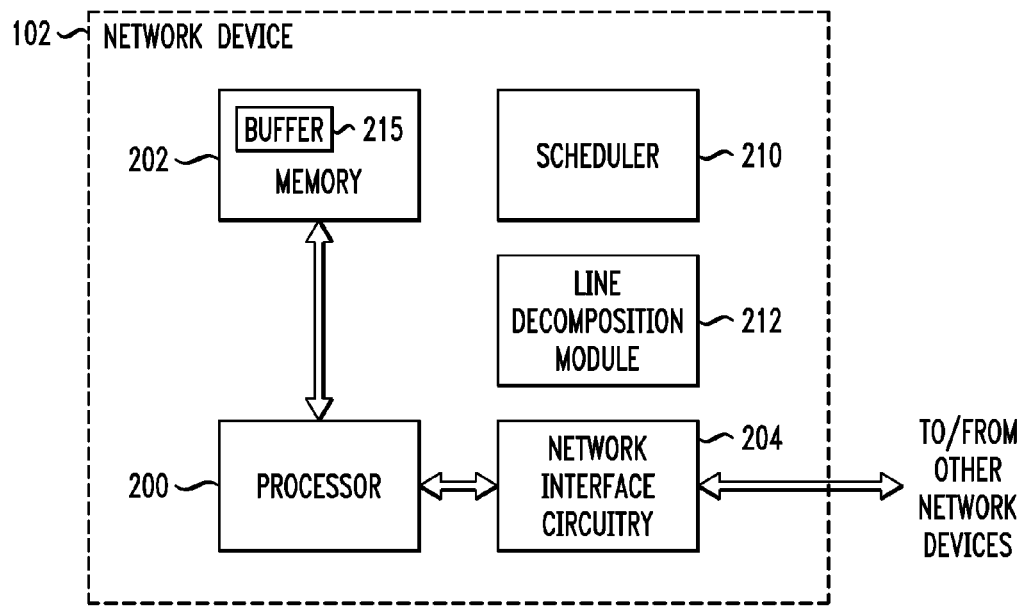
FIG. 2 is a more detailed view of a particular network device of the FIG. 1 network.

Referring now to FIG. 2, one possible implementation of a given network device 102 of the network 100 is shown. In this embodiment, the network device comprises a processor 200 coupled to a memory 202, and further comprises network interface circuitry 204. Also included in the network device are a scheduler 210 and a line decomposition module 212. The memory 202 comprises a buffer 215 for storing received packets to be transmitted or otherwise processed by the network device. It should be noted that the term "packet" as used herein is intended to be construed broadly, so as to encompass, for example, a wide variety of different types of protocol data units.

The processor 200 may be implemented as a microprocessor, a microcontroller, an application-specific integrated circuit (ASIC) or other type of processing device, as well as portions or combinations of such devices. The memory 202 may comprise an electronic random access memory (RAM), a read-only memory (ROM), a disk-based memory, or other type of storage device, as well as portions or combinations of such devices. The processor and memory may be used in storage and execution of one or more software programs for scheduling of active and inactive periods of the network device, as well as for performing related operations, such as those associated with decomposition of a network into one or more lines of network devices. The modules 210 and 212 may therefore be implemented at least in part using such software programs. The memory 202 may be viewed as an example of what is more generally referred to herein as a computer program product or still more generally as a computer-readable storage medium that has executable program code embodied therein. Other examples of computer-readable storage media may include disks or other types of magnetic or optical media, in any combination.

The processor 200, memory 202 and interface circuitry 204 may comprise well-known conventional circuitry suitably modified to operate in the manner described herein. Conventional aspects of such circuitry are well known to those skilled in the art and therefore will not be described in detail herein.

It is to be appreciated that a network device as disclosed herein may be implemented using components and modules other than those specifically shown in the exemplary arrangement of FIG. 2.

The operation of the network devices 102 in illustrative embodiments will now be described with reference to FIGS. 3 through 7.

Figure 3:
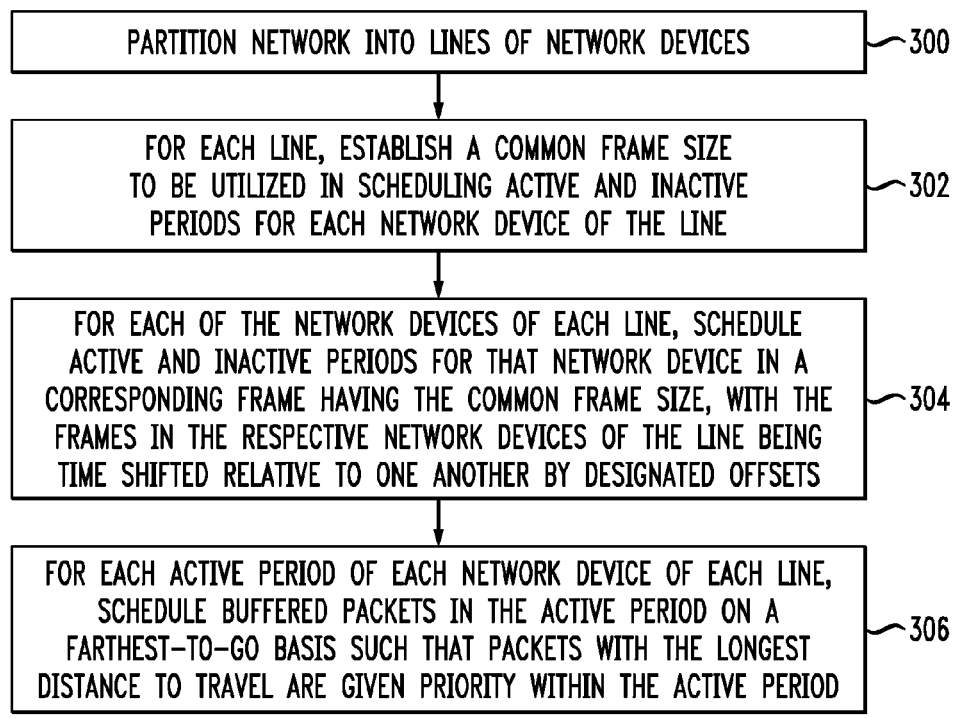
FIG. 3 is a flow diagram showing the operation of a scheduling process implemented in the FIG. 1 network.

FIG. 3 is a flow diagram of a scheduling process implemented in the network 100 of FIG. 1 in one embodiment of the invention. The scheduling process in this embodiment generally partitions a network into multiple lines of network devices, schedules active and inactive periods in frames at respective ones of the network devices on each line, and schedules packets for processing within each active period. The process includes steps 300 through 306 as shown.

Figure 4:
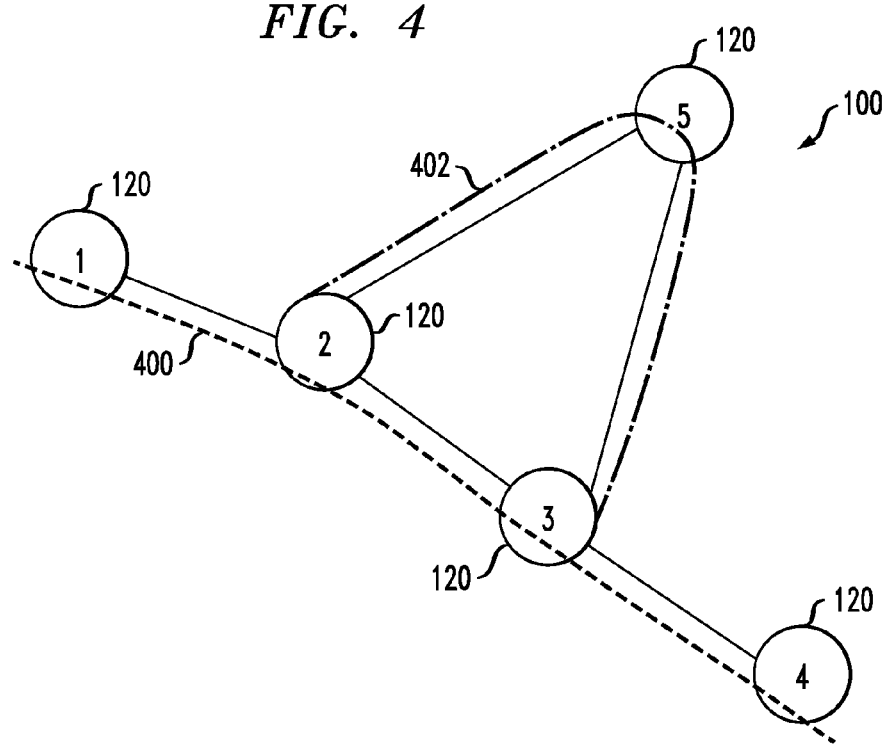
FIG. 4 shows an exemplary line decomposition of a portion of a network.
Figure 5:
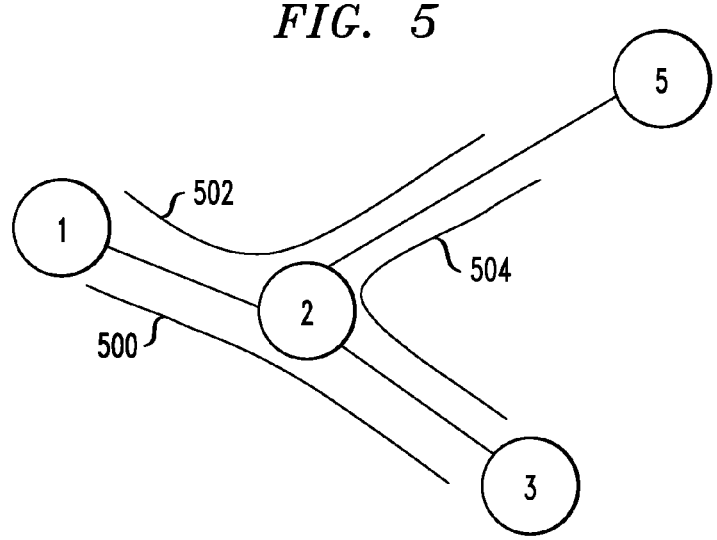
FIG. 5 illustrates possible routes between certain ones of the network devices in the network portion of FIG. 4.

In step 300, at least a portion of the network 100 is partitioned into sets of network devices 102 that are interconnected in lines. This partitioning is performed using the line decomposition modules 212 of the network devices 102. An example of one type of line decomposition that may be used to partition the network into lines in step 300 is illustrated in FIGS. 4 and 5. This may be viewed as a type of maximum-flow decomposition, and is suitable for a network of general topology.

FIG. 4 shows a portion of the network 100, with particular ones of the network devices 102 identified as nodes 1, 2, 3, 4 and 5. This portion of the network is illustratively partitioned into a first line 400 comprising nodes 1, 2, 3 and 4, and a second line 402 comprising nodes 2, 5 and 3, using maximum-flow decomposition. This generally involves determining at each of the nodes the particular input and output links that carry the most throughput traffic flow and declaring those links to be on the same line. More specifically, to partition the network into lines, at each node we match the two links that have the most throughput traffic flow and assign those two links to the same line, and repeat this process until all links incident to each node are matched. If a ring occurs as a result of this decomposition process, the ring can be cut at an arbitrary point to create a line.

Assume by way of example that the traffic passing through node 2 can follow directions of 1-2-3, 1-2-5 or 3-2-5, identified by respective reference numerals 500, 502 and 504 The line decomposition module 212 at node 2 determines which of these directions stays within a given line. In the example as illustrated in FIG. 4, assume 1-2-3 carries more traffic than 1-2-5 or 3-2-5. Nodes 1, 2 and 3 are therefore all on line 400, such that the traffic for 1-2-3 stays on the same line. Traffic for 1-2-5 or 3-2-5 has to switch from line 400 to line 402 at node 2. By keeping the higher traffic links on the same line, the number of packets that have to switch lines is minimized. This is important because every switch from one line to another can potentially introduce delay in packet processing, as each packet may have to wait to catch up with the schedule of the new line. However, it is a particular advantage of the coordinated scheduling of active and inactive periods as disclosed herein that packets generally do not have to wait for an active period at each network device of a given line, but instead have to wait only when switching from line to line.

It should be noted that step 300 does not require the use of any particular decomposition process. Another embodiment of the invention utilizes a so-called "caterpillar" decomposition to partition a network having a tree structure into lines of network devices, and will be described in greater detail below. Thus, the scheduling process of FIG. 3 can be applied to any line or lines of network devices regardless of the particular manner in which those lines are determined However, it is preferable to use a decomposition that tends to minimize the switching of packets between lines.

After the lines of network devices have been determined, the scheduling process of FIG. 3 continues with step 302. In this step, for each of the lines of network devices, a common frame size is established to be utilized in scheduling active and inactive periods for each network device of the line. The common frame size in the illustrative embodiments is given by a specified frame length T, as will be described, although other types of common frame sizes may be used. In step 304, for each of the network devices of each line, active and inactive periods for that network device are scheduled in a corresponding frame having the common frame size, with the frames in the respective network devices of the line being time shifted relative to one another by designated offsets.

By way of example, the scheduling of active and inactive periods for a given line of network devices may proceed in the following manner. Assume that the line of network devices is line 400 of FIG. 4, comprising at least nodes 1, 2, 3 and 4. Let T denote the common frame size, such that the schedule of active and inactive periods at each node of the line repeats every T units of time. Let the active period of each node be equal to rT, where r is the rate of packet arrival at the node, with the node otherwise being inactive. This means, in principle, that there is enough active time at each node to process all packets. Under the foregoing assumptions, one possible schedule for the present example is as follows: node 1 is active in the period [0, rT]; node 2 is active in the period [$p_1$, $p_1$+rT], where $p_1$ is the transmission time for a packet to go from node 1 to node 2; node 3 is active in the period [$p_1$+$p_2$, $p_1$+$p_2$+rT], where $p_2$ is the transmission time for a packet to go from node 2 to node 3; and so on for other nodes of the line. In this way, after a packet is processed by one node in the line it will arrive in time to be processed by the next node of the line. It is to be appreciated that this simple example is just one possible illustration of the scheduling of active and inactive periods in network devices of a given line. Other examples will be described below in conjunction with FIGS. 6 and 7. The scheduling of active and inactive periods is repeated for each of the other lines of network devices determined in the partitioning step 300.

In step 306, for each active period of each network device of each line, buffered packets are scheduled for processing in the active period. In this embodiment, the packets are scheduled in each active period on a farthest-to-go (FTG) basis such that packets with the longest distance to travel are given priority within the active period. That is, packets with a longer distance to travel from the scheduling node in the network are scheduled for processing before packets having a shorter distance to travel from the scheduling node in the network. Accordingly, during the active periods, buffered packets are processed such that the packet farthest away from its destination goes first.

Although the FIG. 3 embodiment uses an FTG approach to schedule packets for processing in a given active period of a network device, other embodiments may use other types of "best effort" scheduling for the active periods, or combinations of different scheduling techniques, possibly at different nodes.

It can be shown that with an appropriate scheduling of the active and inactive periods for each node of a given line, a packet will wait only once for the active period of its first node. Once it starts moving, it continues to move until it gets to the destination. Although a packet may have to wait again for an active period when it switches from one line to another, the delay accumulated is determined by the number of lines switched, not the number of nodes traversed. The latter is usually a much larger number than the former.

Figure 6:
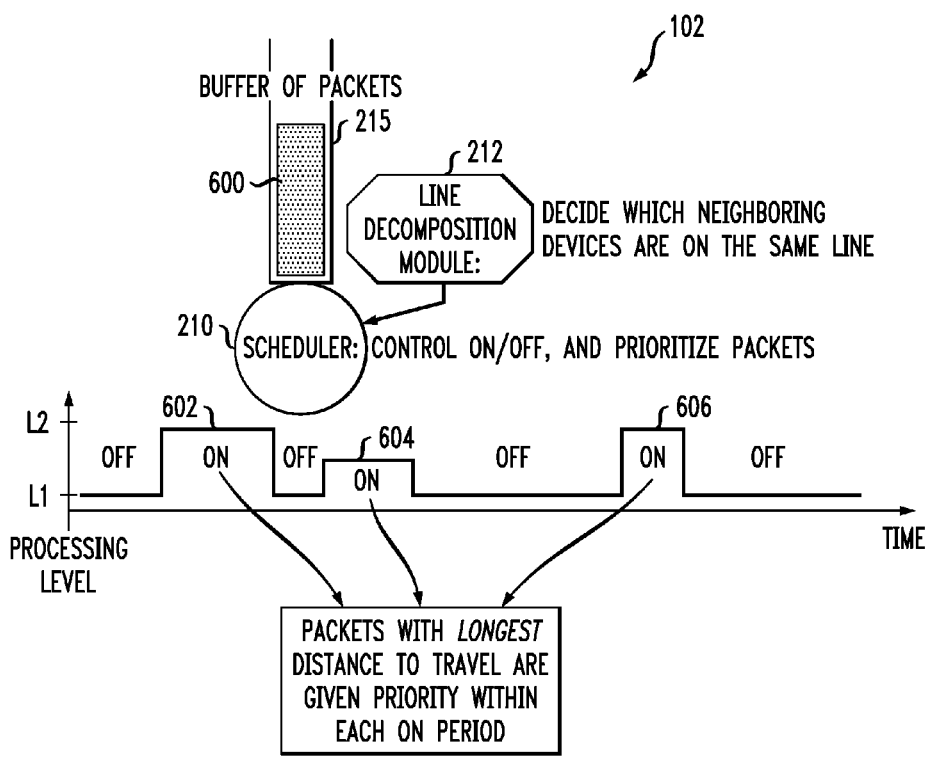
FIG. 6 illustrates the operation of an exemplary scheduler within a given one of the network devices of the FIG. 1 network.

FIG. 6 illustrates the operation of an exemplary scheduler 210 within a given one of the network devices 102 of the FIG. 1 network. The scheduler 210 in this embodiment is coupled to line decomposition module 212 and buffer 215. The line decomposition module 212 determines which of the neighboring network devices are on the same line as the given network device. The buffer 215 stores packets 600 that are received at the network device. The scheduler 210 controls the active and inactive periods of the network device within a repeating frame, and also prioritizes packets within each active period. The active and inactive periods are also referred to herein as "on" and "off" periods, although the network device need not be entirely on or off during these periods. For example, as illustrated in the figure, the off periods of the frame correspond to a relatively low processing level L1. Each of the on periods in this frame has a different relatively high processing level. For example, a first on period 602 of the frame is associated with a processing level L2, while second and third on periods 604 and 606 have respective processing levels that are slightly lower and slightly higher, respectively, than the processing level L2 of the first on period. Thus, two or more of the active periods of a given one of the network devices of a particular line may each correspond to different processing levels within the corresponding frame. Within each of the active periods 602, 604 and 606, the scheduler 210 gives processing priority to the packets with the longest distance to travel to their respective destinations, as indicated in step 306 of FIG. 3.

Figure 7:
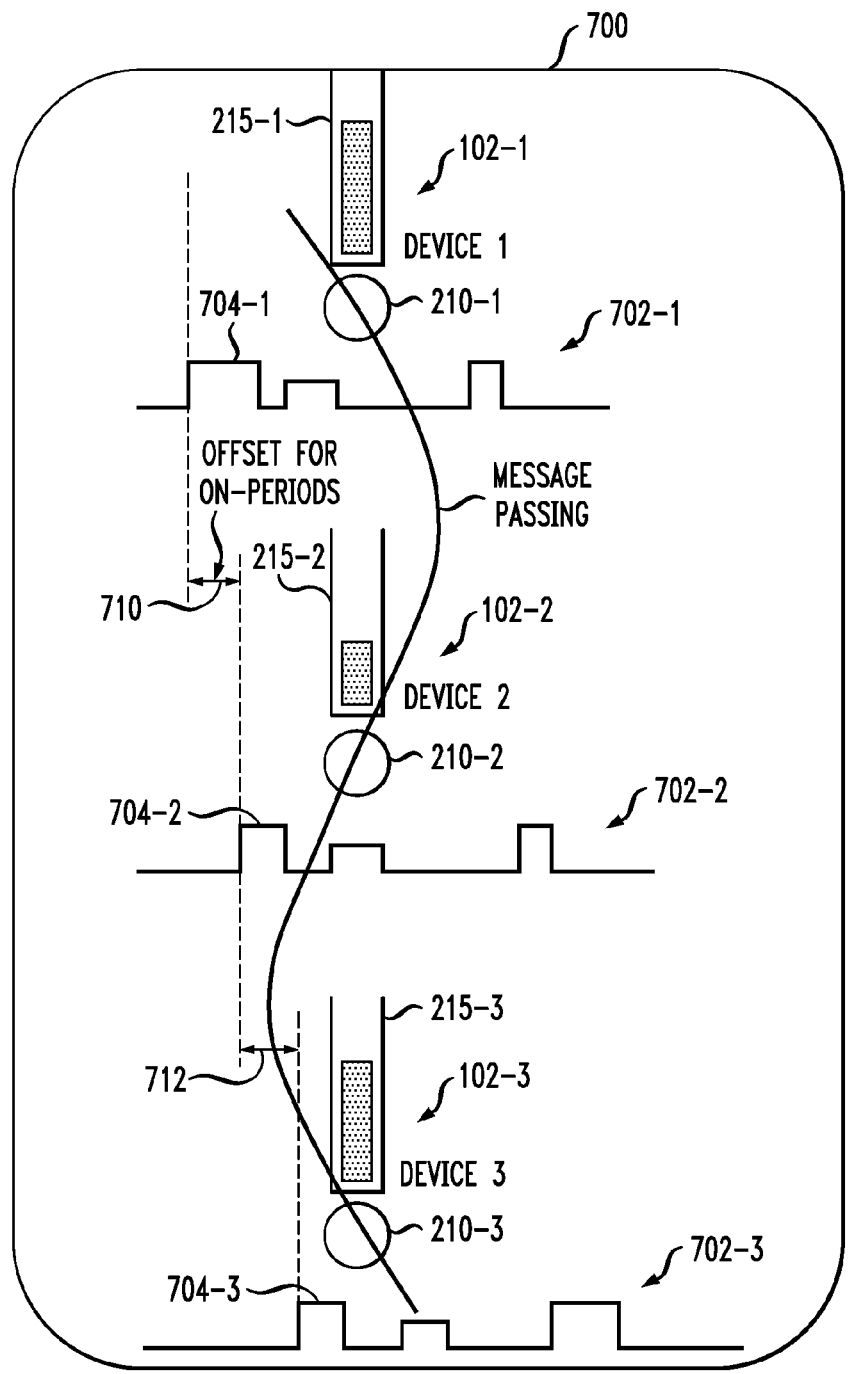
FIG. 7 illustrates interactions between network devices on a line of such devices in the FIG. 1 network.

FIG. 7 shows the interactions between a set of network devices 102-1, 102-2 and 102-3 that are part of a line 700. The devices are also denoted Device 1, Device 2 and Device 3, and may be viewed as corresponding to respective ones of the nodes 1, 2 and 3 in the example of FIG. 4. Each of the devices is generally configured in the manner illustrated in FIG. 6, and thus includes a scheduler 210-1, 210-2 or 210-3 and a buffer 215-1, 215-2 or 215-3. The decomposition modules are omitted from the figure for clarity and simplicity of illustration. As indicated in step 304 of FIG. 3, each of the network devices of the line schedules its active and inactive periods in a corresponding frame having the common frame size, with the frames in the respective network devices of the line being time shifted relative to one another by designated offsets. In the present embodiment, schedulers 210-1, 210-2 and 210-3 schedule active and inactive periods of their respective network devices in respective frames 702-1, 702-2 and 702-3, each of which has the same frame length. It can be seen that the frames 702-1, 702-2 and 702-3 are offset from one another in that the starting points of their respective initial on periods 704 -1, 704-2 and 704-3 are staggered in time. More specifically, there is a designated offset 710 between the start of on period 704-1 at Device 1 and the start of on period 704-2 at Device 2. Similarly, there is a designated offset 712 between the start of on period 704-2 at Device 2 and the start of on period 704-3 at Device 3. Additional network devices of the line 700, which are not shown in the figure, may similarly have their respective frames time shifted relative to one another.

The network devices 102 in the FIG. 7 embodiment communicate with one another by passing messages that specify the offsets and possibly other information, as indicated by the curved line passing through the devices in the figure. For example, the network device 102-1 of line 700 may send a message to the network device 102-2 of line 700 with the message specifying the offset 710 to be applied between their respective frames 702-1 and 702-2. Similarly, the network device 102-2 may send a message to the network device 102-3 with the message specifying the offset 712 to be applied between their respective frames 702-2 and 702-3. In this example, the particular offset denotes a time separation between start of a first active period of the frame in the one of the network devices and start of a first active period of the immediately adjacent network device of the line. Thus, each of the network devices 102 of the line 700, other than a final network device of the line, may send to its immediate downstream neighboring network device of the line a message specifying an offset between initial active periods of the respective sending and neighboring network devices. Other information that may be communicated using similar messaging includes, for example, information utilized by the respective line decomposition modules 212 of the network device 102 to determine which of the devices are associated with the same line.

With reference to the frames 702-1, 702-2 and 702-3 in the FIG. 7 embodiment, it can be seen that the scheduled active and inactive periods in each frame may be different. Thus, a given scheduled frame for one of the network devices of the line 700 may have a different arrangement of active and inactive periods than a corresponding scheduled frame for another one of the network devices of the line. Also, at least one of the active periods of one of the network devices of the line may correspond to a different processing level than at least one of the active periods of another one of the network devices of the line, as is apparent from the figure.

A more detailed example of an embodiment of the invention will now be described. In this embodiment, it is assumed that each network device either operates in a full-rate active mode or a zero-rate sleeping mode. The network supports a set of connections, each of which needs to transmit packets between a pair of nodes at a specified rate. Connection i is routed along path $P_i$, where $P_i$ can be either given as input or be computed as part of the output. We study both situations. If the routes are not part of the input, the routing part of the problem specifies a route $P_i$ for each connection i. The packet arrival is leaky-bucket controlled and connection i has a desired rate of $\rho_i$. The scheduling part of the problem specifies the active period of each link, i.e. when a link operates at the full rate normalized to R=1, and how packets are prioritized within each active period. Transitioning between two modes takes $\delta$ units of time, and consumes energy at the same rate as the full rate, though the network device cannot process any packets during the transition.

It is to be understood that references in the context of this particular example to scheduling of links are intended to encompass scheduling of respective network devices that drive those links.

We focus on frame-based schedules, in which each link is active for a fixed duration within every frame of length T, (0,T], (T,2 T], . . . . Let $R_e = \Sigma_{i:e \in P_i} \rho_i$ be the total rates that go through link e. Let $$A_e = T \cdot R_e$$

be the minimum length of an active period for link e. We call a schedule "minimal" if the duration of the active period on each link e is exactly $A_e$. Obviously, for a fixed set of routes and for a fixed T, a minimal schedule is energy optimal.

We prove the following results. For simplicity, we assume that transmitting one packet across a link takes one unit of time, or time step. Our results below generalize to links with arbitrary link transmission times.

We begin with a line topology. Since routing is fixed, we focus on scheduling only. We present a minimal schedule in which the end-to-end delay for each connection i of $k_i$ links is upper bounded by $2T+k_i$. We also present a quasi-minimal schedule in which the duration of the active period is $A_{max} = max_e A_e$ for all e. For this case we show an end-to-end delay of $T+k_i$ for all i.

For each fixed T, the energy-delay trade-off between these two schedules is clear, since the one with smaller delay consumes more energy and vice versa. Within each schedule, we also observe the trade-off since a larger T implies a larger delay bound but fewer active-sleeping transitions, and therefore less energy consumption.

We then show how to apply the line scheduling techniques to obtain results for networks with arbitrary topology. If routing is not part of the input we first choose routes with the objective of minimizing $\Sigma_e A_e$ together with the transition cost. This sum can be approximated to within a factor of $\tilde{O}(\log n)$ where n is the size of the network. In addition, we can also guarantee that the routes form a tree. Using caterpillar decomposition we partition the tree into a collection of lines such that each connection path intersects with at most 2 log n lines. Along each line we adopt the minimal schedule. When a packet moves from line to line, a maximum extra delay of T is sufficient. This allows us to prove an $\tilde{O}(\log n)$ guarantee in the end-to-end delay for all connections.

If routing is already specified, we present a straight-forward minimum schedule with a delay bound of $T \cdot k_i$ for each connection i. However, if links are active for longer in sufficiently large frames, then we give an improved delay bound. This again demonstrates a trade-off between energy and delay.

Scheduling Over a Line

As indicated above, we begin with scheduling a set of connections over a line. The terminals of each connection are not necessarily the end points of the line. Although the line topology is restricted, the solution is used as a building block for handling arbitrary topologies. For a line, we can choose any frame size T, as long as $T \geq +A_e + 2\delta$ for all e. Since $A_e = T \cdot R_e$, implies $$T \geq \max_e \frac{2\delta}{1 - R_e}.$$

It will be shown below that for a line topology, after an initial delay of at most T, each packet can reach its destination with at most $A_{max}$ additional queuing delay. The activation period is $A_e$, which is minimal for each link e.

We first define a minimal schedule. Let us label the links along the line as $e_1, e_2$, etc. For any integer $j \geq 1$, the j th active period for the i th link $e_i$ is $[jT+i, jT+i+A_{e_i})$. From now on we consider a fixed j. Let $S_i$ be the set of packets that have $e_i$ as their first link and that are injected during the period $[(j-1)T+i, jT+i)$. We show in the following that the packets in $\cup_i S_i$ travel to their destinations during the j th active period of each link.

We assign to these packets timeslots in the active periods such that i) for each packet the timeslots over its routing path are non-decreasing; and ii) for two packets that share a common link, they are assigned distinct slots over this common link. With these requirements, the timeslots define when each packet gets to advance.

From packets in $\cup_i S_i$, we repeatedly extract those whose paths form a minimal cover of the entire line, i.e. any proper subset of these packet paths cannot cover the entire line. From this minimal cover C, we removed overlaps and create an exact cover in which each link is covered by exactly one packet path. Since C is minimal, we start with the unique packet path, say p, that contains $e_1$. We walk along p until it first overlaps with another packet path, say q. We keep p−p∩q for the exact cover and remove p∩q. Note that due to the minimality of C, q again is unique. We proceed to walk along q until it overlaps with another packet path. We remove the overlap from q in a similar manner. When all overlaps are removed, C becomes an exact cover. Now every path C is assigned the next available timeslot from each of the active periods. Note that the next available timeslot is the k th slot of each active period for some common k. This invariant holds through a simple induction. Note also that if a packet path is cut, the removed part always follows the unremoved part and is therefore always assigned a larger timeslot later on. This ensures the timeslot assignment is feasible for packet movement. When the union of the remaining packet paths does not cover the entire line, we carry out the above process on each disconnected line. Note also that at most $A_e$ of packets in $\cup_i S_i$ require each link e. The active periods therefore have enough slots for all packets. Hence, in addition to transmission time (reflected by the shifts of the active periods from one link to the next) packets in $\cup_i S_i$ experience a total of at most $A_{max}$ queuing time.

The above centralized algorithm that iteratively creates covers can be replaced by the previously-mentioned FTG. For each link e, during its active period FTG gives priority to the packet in $\cup_i S_i$ that has the highest number of remaining links to traverse. To see that FTG fits the centralized algorithm described above, we note that for each k≥0, the packets that use the k th timeslot in each active interval have their packet paths form a minimal cover of the line.

If we relax the active period of each link to be $A_{max}$, each packet experiences no queuing delay once it starts moving, after an initial delay of up to T. It can be shown that for a line topology, after an initial delay of at most T each packet can reach its destination with no further queuing delay. The activation period is $A_{max}$ for each link. This may be shown as follows. For any integer j≥1 the j th active period for the i th link $e_i$ along the line is $[jT+i, jT+i+A_{max})$. Again let $S_i$ be the set of packets that have $e_i$ as their first link and that are injected during the period $[(j−1)T+i, jT+1)$. The packets in $\cup_i S_i$ travel to their destinations during the j th active period of each link. To see this, note that at most $A_{max}$ of the packets from $\cup_i S_i$ have e along their paths. Therefore, the well-known interval graph coloring result implies that each packet in S can be assigned a color in $[1, A_{max}]$ such that two packets are assigned distinct colors if they share any link in common. These colors define the timeslots during the active periods that the packets can advance. In this way, when a packet moves from one link to the next it has a slot immediately available for transmission.

Combined Routing and Scheduling

We now turn our attention to the case of an arbitrary network topology. If routing is not given as input, we first choose a path $P_i$ for each connection i. Recall that $R_e = \Sigma_{i:e \in P_i} \rho_i$ is the total rate on link e as a result of routing. Let $$f(R_e) = \begin{cases} 0 & \text{for } R_e = 0 \\ 2\delta + R_e T & \text{for } R_e > 0. \end{cases}$$

By routing connections with the objective of min $\Sigma_{i,e} f(R_e)$ we minimize the total active periods together with the transition time over all links, and therefore minimize the energy. Note that the above formulation only makes sense when $R_e < 1$. We can reasonably assume $R_e \ll 1$ regardless of routing since energy reduction is motivated by the scenario in which full rate R=1 is significantly larger than what is needed.

Note that f(·) is a concave function and the routing problem in fact corresponds to the well-studied buy-at-bulk network design problem. One possible solution utilizes the concept of probabilistically approximating metrics by tree metrics. See B. Awerbuch and Y. Azar, "Buy-at-bulk network design," Proc. IEEE FOCS, 1997, and Y. Bartal, "On approximating arbitrary metrics by tree metrics," Proc. ACM STOC, 1998. The idea is to approximate distances in a graph G by a probability distribution over trees. In particular, let $d_{ij}(G)$ be the length of link (i, j) in the graph G. Suppose that tree H is randomly chosen according to the probability distribution and let $d_{ij}(H)$ be the distance between i and j in the tree H. We say that the probability distribution over trees α—probabilistically approximates the graph G if, $$E(d_{ij}(H))/\alpha \leq d_{ij}(G) \leq d_{ij}(H).$$

In the above-cited Awerbuch and Azar reference, it is shown that an a stretch implies an O(α) approximation for buy-at-bulk if we randomly pick a tree according to the probability distribution and then route all connections along the unique path specified by the tree.

We use the following result on α: Every network G can be α-probabilistically-approximated by a polynomially computable probability distribution over spanning trees, for $\alpha = \tilde{O}(\log n)$. The notion of $\tilde{O}(\log n)$ hides terms log log n and smaller. In fact the exact value of α is $O(\log n \log \log n \log^3 \log \log n)$. This implies that there is a randomized algorithm that chooses a routing such that the total active period together with the transition time is $\tilde{O}(\log n)$ times the minimum optimal. In addition, the routes form a tree, and for any connection the expected routing distance over the tree is $\tilde{O}(\log n)$ times the shortest path distance over the original network.

We further take advantage of the fact that the resulting routes form a tree. We solve the scheduling problem by combining caterpillar decomposition of a tree and scheduling over a line topology. More specifically, we design a minimal schedule on a line under which the queuing delay of a packet is at most T initially plus a total of at most $A_{max} = T \cdot R_{max}$ once the packet starts moving. Given that the links that support the routing form a tree, we show below that caterpillar decomposition allows us to partition this tree into a collection of lines so that the routing path of each connection goes through at most 2 log n lines. Every time a packet switches to a new line, in the worst case, it pays for an initial queuing delay.

Knowing how to schedule on a line, we partition the routing tree into a collection of lines in a fashion similar to the caterpillar decomposition. In accordance with this decomposition, any tree can be partitioned into lines, such that the unique path between any two nodes traverses at most 2 log n lines, where n is the number of nodes in the tree. For additional details on caterpillar decomposition, see J. Matoušek, "On embedding trees into uniformly convex banach spaces," Israel Journal of Mathematics, 114:221-237, 1999.

Once the tree is decomposed into lines, the previously-described minimal schedule is used in each line. The expected end-to-end delay of connection i is 4 T log n+$\tilde{O}$(k, log n), where $k_i$ is the shortest path distance over the original network. Further, the schedule is minimal This can be shown as follows. The stretch of the spanning tree implies the length of the routing path in the selected tree is $\tilde{O}$(log n) times the shortest path distance in the original graph. Therefore, the transmission time is $\tilde{O}$(log n) times $k_i$. From caterpillar decomposition, a routing path in the tree may be partitioned into 2 log n lines. Therefore, the queuing delay is at most 2 log n times the maximum delay in one line, $T+A_{max} \leq 2$ T.

Observe that as $R_e \ll 1$, the length of the non-active period in each frame is $T-A_e = \Omega(T)$. Then, a packet that arrives at the beginning of this period has to wait $\Omega(T)$ before moving. Hence, the packet delay for connection i is lower bounded as $\Omega(T+k_i)$. It can be further shown that the combined routing and scheduling scheme ensures an $\tilde{O}$(log n) approximation for delay minimization and $\tilde{O}$(log n) for energy minimization.

Scheduling with Given Routes

In the previous section on the combined routing and scheduling scheme, we took advantage of the fact that the routes form a tree. In this section we focus on scheduling assuming routes are given as input, and assume these routes form an arbitrary topology.

A. Energy-Optimal Algorithm

We begin with a simple algorithm to demonstrate that a minimal schedule is always possible in a network of arbitrary topology, but a packet may experience a delay of T per link. Let $k_i$ be the hop count of route $P_i$ for connection i. For a network with an arbitrary topology, the end-to-end delay of connection i is bounded by $T \cdot k_i$ under a minimal schedule. This can be shown as follows. We first define a minimal schedule. For each time frame, link e is activated for the first $T \cdot R_e$ time steps. At the start of time step jT, let $S_e$ be the set of packets queuing at link e. During the time frame [jT,(j+1)T), only packets from $S_e$ advance along link e. That is, packets that arrive during [jT, (j+1)T) have to wait till the next frame [(j+1)T, (j+2)T) even if there is room during the active period [jT, jT+$TR_e$). In the following we show that $|S_e| \leq TR_e$. We assume inductively that so far it takes one frame for each packet to advance one link. Therefore, $S_e$ consists of packets from connections that start at link e and are injected during [(j−1)T, jT), and from connections that have e as the i th link and are injected during [(j−i)T,(j−i+1)T). The total rate of these connections is $R_e$. Therefore, $|S_e| \leq T \cdot R_e$. Since all packets from $S_e$ are queuing at link e at the beginning of a time frame, they can be transmitted along link e during the active period of the frame which is the first $T \cdot R_e$ time steps.

This minimal schedule can be seen as a trivial decomposition of connection routes into lines in which each link is a different line. For that reason a packet experiences a line switch and hence a delay of at most T at each edge. Clearly, any other decomposition of the connection paths into lines would improve the end-to-end delay by reducing line switches. Unfortunately, there is not a lot of room for improvement in the worst case, since it is possible to find networks and connection sets such that, independent of how the decomposition is done, almost every connection i will experience $\Omega(k_i)$ line switches. However, experimental results discussed below indicate that at a practical level this could be a promising approach.

B. Delay-Improved Algorithm

If we allow the active period to be non-minimal, the maximum delay suffered by the packets can be reduced to 2 T, for large enough T. More specifically, for sufficiently large frame size T, all packets injected during one frame can reach their destinations during the active period of the next frame, and the length of the activation period is at most T+O($k_{max}$ ln(mT)), where m is the number of links in the network and $k_{max}=\max_i k_i$.

Experimental Results

In this section, we compare via simulation two frame-based schedules, namely, a coordinated schedule and a simple schedule without coordination. Both schedules are minimal, and hence are optimal in terms of energy. Therefore, we use the average and maximum delay of packets as the quality metrics when comparing the two schedules. The coordinated schedule, referred to herein as schedule with coordination (SWC) is defined for lines. It activates each edge e for a time $A_e$ in each frame, with the active periods shifted along the line, and applies the FTG scheduling protocol in each of the edges of the line, as was described previously. The schedule without coordination (SWOC) simply activates each edge e for a time $A_e$ at the beginning of the frame, and uses FIFO to schedule packets.

Two sets of simulations are performed. The first set uses a network which is a line, while the second set uses a general network. In each scenario, the number of connections is fixed, with the terminals of each connection chosen uniformly at random among all the nodes in the network. The connection rate is fixed to $\rho=1/50$, so that $\rho T$ packets arrive for each connection in each T-frame. Every packet arrives at a uniformly chosen time step within the frame. However, SWC does not schedule packets to move until the next frame, even if the link is active and there are available time slots. For any given set of parameters, the experiment corresponding to these parameters is performed 10 times, and the observed results averaged.

A. Lines

We first present the simulation results on a network which is a line of 40 links. In this network 50 connections with path length 10 are randomly chosen. Then, simulations with time frame size T in the range 50 to 250 are performed. From the results of these simulations, it is observed that the SWC provides significantly smaller end-to-end delay than the SWOC. Both the average and maximum end-to-end delays increase with T under SWC and SWOC. However, the growth is faster under SWOC, which means that the larger the frame, the more convenient it is to use SWC instead of SWOC. We have also observed that changing the length of the connection path does not change the fact that SWC performs better than SWOC. For instance, for a path length of 30, SWC gives at least 26% better average end-to-end delay than SWOC. Thus, coordinated scheduling of active and inactive periods can significantly reduce delay for a given amount of active time.

B. NSF Network

The second network we consider is the NSF network, which consists of 14 nodes and 20 links. In this and any arbitrary network, SWOC works as it did in the line, simply using shortest path routing. However, we need to define how to make SWC work in the NSF network and in any arbitrary network in general. The solution is to do line decomposition: decompose the network into edge-disjoint lines, route connections along the lines, and use SWC in each line. In this case, we manually decompose the NSF network into four link-disjoint lines.

When necessary, a packet has to switch lines. In our simulations, when this occurs, the switching packet p is treated in the new line as any new arriving packet and, in particular, p will not move until the next frame. This highly penalizes SWC at each line switch. We are interested in the impact of line switches on the end-to-end delay with respect to the path length, captured by a parameter κ, which is the ratio of the length of a connection path to the number of line switches.

Since the original NSF network is small, we extend the NSF network by replacing each link with a path of length l. This allows increasing the ratio κ just defined without changing the number of line switches. Hence, in our simulations l roughly represents the above ratio.

In each experiment in the NSF network 100 connections are created. In each connection the same number of packets ρT is injected in each terminal node towards the other in each T-frame. As mentioned above, these packets are routed via shortest paths when using SWOC and via decomposition lines when using SWC. The results of the simulations indicate that for small l (e.g. l=1), SWC and SWOC have comparable performances. However, as l becomes larger (e.g. l=10), SWC provides significantly better delays than SWOC, both on average and in the worse case. Table I below summarizes several parameters observed in the experiments for the values l=1,10. It is readily apparent from the table that l in fact behaves as the ratio κ. Hence, from this table and the other results described above one can conclude that as the ratio κ grows (e.g., 2.0/0.63<20.7/1.1), SWC gives much better end-to-end delay performance than SWOC.

TABLE I

Length of Connection Paths and Number of Line Switches

| l | # of nodes | $R_c$ Average | $R_c$ Max | Connection Length Average | Connection Length Max | Line Switches Average | Line Switches Max |
|---|---|---|---|---|---|---|---|
| 1 | 14 | 0.20 | 0.46 | 2.0 | 4.0 | 0.63 | 2.0 |
| 10 | 194 | 0.21 | 0.42 | 20.7 | 44 | 1.1 | 4 |

It is to be appreciated that the foregoing detailed example is presented in order to illustrate the performance advantages of particular embodiments of the invention, and the assumptions made in the course of the example need not apply in other embodiments of the invention.

As indicated above, embodiments of the present invention may be implemented at least in part in the form of one or more software programs that are stored in a memory or other computer-readable storage medium of a network device or other processing device of a communication network. Device components such as the scheduler 210 and line decomposition module 212 may be implemented at least in part using software programs. Also, as indicated previously, instead of being implemented in each individual network device, these components can instead be implemented in a centralized device such as controller 104.

Of course, numerous alternative arrangements of hardware, software or firmware in any combination may be utilized in implementing these and other system elements in accordance with the invention. For example, embodiments of the present invention may be implemented in one or more field-programmable gate arrays (FPGAs), application-specific integrated circuits (ASICs) or other types of integrated circuit devices, in any combination. Such integrated circuit devices, as well as portions or combinations thereof, are examples of "circuitry" as the latter teem is used herein.

It should again be emphasized that the embodiments described above are for purposes of illustration only, and should not be interpreted as limiting in any way. Other embodiments may use different types of networks, device configurations, and communication media, depending on the needs of the particular application. Alternative embodiments may therefore utilize the techniques described herein in other contexts in which it is desirable to provide energy efficiency in a communication network by coordinated scheduling of active and inactive periods in network devices. Also, it should be understood that the particular assumptions made in the context of describing the illustrative embodiments should not be construed as requirements of the invention. The invention can be implemented in other embodiments in which these particular assumptions do not apply. These and numerous other alternative embodiments within the scope of the appended claims will be readily apparent to those skilled in the art.

What is claimed is:

1. A method comprising the steps of:
   identifying a set of network devices interconnected in a line within a network;
   establishing a common frame size for scheduling of active and inactive periods at each network device of the line;
   for each of the network devices of the line, scheduling active and inactive periods for that network device in a corresponding frame having the common frame size, with the corresponding frames in the respective network devices of the line being time shifted relative to one another by designated offsets; and
   for each of one or more of the active periods of each of the network devices of the line, scheduling received packets for processing in that network device.

2. The method of claim 1 wherein the step of scheduling the received packets for processing further comprises scheduling the received packets on a farthest-to-go basis such that, within the active period, packets having a longer distance to travel in the network are given priority over packets having a shorter distance to travel in the network.

3. The method of claim 1 wherein the identifying step comprises partitioning the network into a plurality of lines each comprising a corresponding set of network devices interconnected in a line, and further wherein a given one of the packets switches from a first one of the lines to a second one of the lines and in conjunction with that line switch waits at a first network device of the second line for a first active period of a frame in the first network device.

4. The method of claim 1 further comprising the step of a first one of the network devices of the line sending a message to a second one of the network devices of the line wherein said message specifies a particular one of the offsets between the frame in the first network device and the frame in the second network device.

5. The method of claim 4 wherein the particular offset denotes a time separation between start of a first active period of the frame in the first network device and start of a first active period of the frame in the second network device.

6. The method of claim 4 wherein each of the network devices of the line other than a final network device of the line sends to its immediate downstream neighboring network device of the line a message specifying an offset between initial active periods of the respective sending and neighboring network devices.

7. The method of claim 1 wherein a given scheduled frame for one of the network devices of the line has a different arrangement of active and inactive periods than a corresponding scheduled frame for another one of the network devices of the line.

8. The method of claim 1 wherein the active and inactive periods for a given one of the network devices are respective on and off periods for the given network device.

9. The method of claim 1 wherein the active and inactive periods for a given one of the network devices are respective periods of designated first and second processing levels.

10. The method of claim 1 wherein two or more of the active periods of a given one of the network devices of the line each correspond to different processing levels within the frame.

11. The method of claim 1 wherein at least one of the active periods of one of the network devices of the line corresponds to a different processing level than at least one of the active periods of another one of the network devices of the line.

12. An article of manufacture comprising a non-transitory computer-readable storage medium having embodied therein executable program code that when executed by a processor of a processing device causes the device to perform the steps of the method of claim 1.

13. An apparatus comprising:
- a first network device comprising a processor coupled to a memory;
- the first network device being configured for interconnection with other network devices in a line within a network wherein a common frame size is established for scheduling of active and inactive periods at each of the network devices of the line;
- the first network device being operative to schedule active and inactive periods of a frame having the common frame size, and for each of one or more of the active periods, to schedule packets for processing within the active period;
- wherein the frame in the first network device is time shifted relative to a corresponding frame in another one of the network devices of the line by a designated offset.

14. The apparatus of claim 13 wherein the first network device is operative to schedule packets for processing on a farthest-to-go basis such that, within the active period, packets having a longer distance to travel in the network are given priority over packets having a shorter distance to travel in the network.

15. The apparatus of claim 13 wherein the first network device is operative to send a message to the other one of the network devices of the line wherein said message specifies the offset between the frame in the first network device and the corresponding frame in the other network device.

16. The apparatus of claim 13 wherein the first network device comprises at least one of a router and a switch.

17. An integrated circuit comprising the apparatus of claim 13.

18. A method for use in a given one of a plurality of network devices, the network devices being configured for interconnection in a line within a network and having a common frame size for scheduling of active and inactive periods at each network device, the method comprising the steps of:
- scheduling active and inactive periods of a frame having the common frame size for the given network device; and
- for each of one or more of the active periods of the given network device, scheduling packets for processing in the given network device within the active period;
- wherein the frame in the given network device is time shifted relative to a corresponding frame in another one of the network devices of the line by a designated offset.

19. A communication network comprising:
- a plurality of network devices including a set of network devices interconnected in a line;
- wherein:
- a common frame size is established for each of the network devices of the line;
- each of the network devices of the line is operative to schedule active and inactive periods of a frame, and for each of one or more of the active periods, to schedule packets for processing within the active period; and
- the frames in the respective network devices of the line are time shifted relative to one another by designated offsets.

20. The network of claim 19 further comprising a controller for coordinating at least a portion of the scheduling operations for the network devices of the line.

* * * * *